United States Patent
Arakawa

[11] Patent Number: 5,613,467
[45] Date of Patent: Mar. 25, 1997

[54] PET ANCHOR

[75] Inventor: Makoto Arakawa, Tokyo, Japan

[73] Assignee: Kabushikigaisha Heisei, Tokyo, Japan

[21] Appl. No.: 487,388

[22] Filed: Jun. 7, 1995

[30] Foreign Application Priority Data

Jul. 7, 1994 [JP] Japan .................................. 6-179580
Aug. 9, 1994 [JP] Japan .................................. 6-207959

[51] Int. Cl.⁶ ...................................................... A01K 1/06
[52] U.S. Cl. ............................. 119/792; 119/771; 119/907
[58] Field of Search ..................................... 119/771, 792, 119/856, 907

[56] References Cited

U.S. PATENT DOCUMENTS

| 2,233,397 | 3/1941 | Bloom | 119/907 X |
| 2,909,154 | 10/1959 | Thomas | 119/771 |
| 4,252,084 | 2/1981 | Willow | 119/771 |
| 4,676,198 | 6/1987 | Murray | 119/856 X |
| 4,879,972 | 11/1989 | Crowe et al. | 119/792 |
| 4,941,434 | 7/1990 | Ellwanger | 119/770 |
| 5,005,526 | 4/1991 | Parker | 119/907 X |

FOREIGN PATENT DOCUMENTS 2201874  3/1987  United Kingdom ................... 119/792

Primary Examiner—Robert P. Swiatek
Assistant Examiner—Yvonne R. Abbott
Attorney, Agent, or Firm—Oblon, Spivak, McClelland, Maier & Neustadt, P.C.

[57] ABSTRACT

A pet anchor including anchor bands, one end of each of which is adapted to be anchored to a seat of vehicle, and an anchor plate connected to the other ends of the anchor bands and adapted to be engaged with a proximal end of a leash for a pet. The anchor plate is formed, at a first portion thereof, with at least one slot. Another end of each of the anchor bands is securable to the anchor plate at one of the slots. The anchor plate is also formed, at a second portion thereof, with an engaging recess having a substantially "C" shaped configuration and within which a looped end of the leash may be fitted. Easy detachment of the leash from the anchor band secured to the seat of vehicle can be achieved via the anchor plate.

13 Claims, 8 Drawing Sheets

PRIOR ART

PET ANCHOR

BACKGROUND OF THE INVENTION

1. Field of the Invention

The present invention relates to a pet anchor for easily and safely anchoring pets such as a dog or a monkey to a seat of vehicle.

2. Description of Background Art

Figure 15:
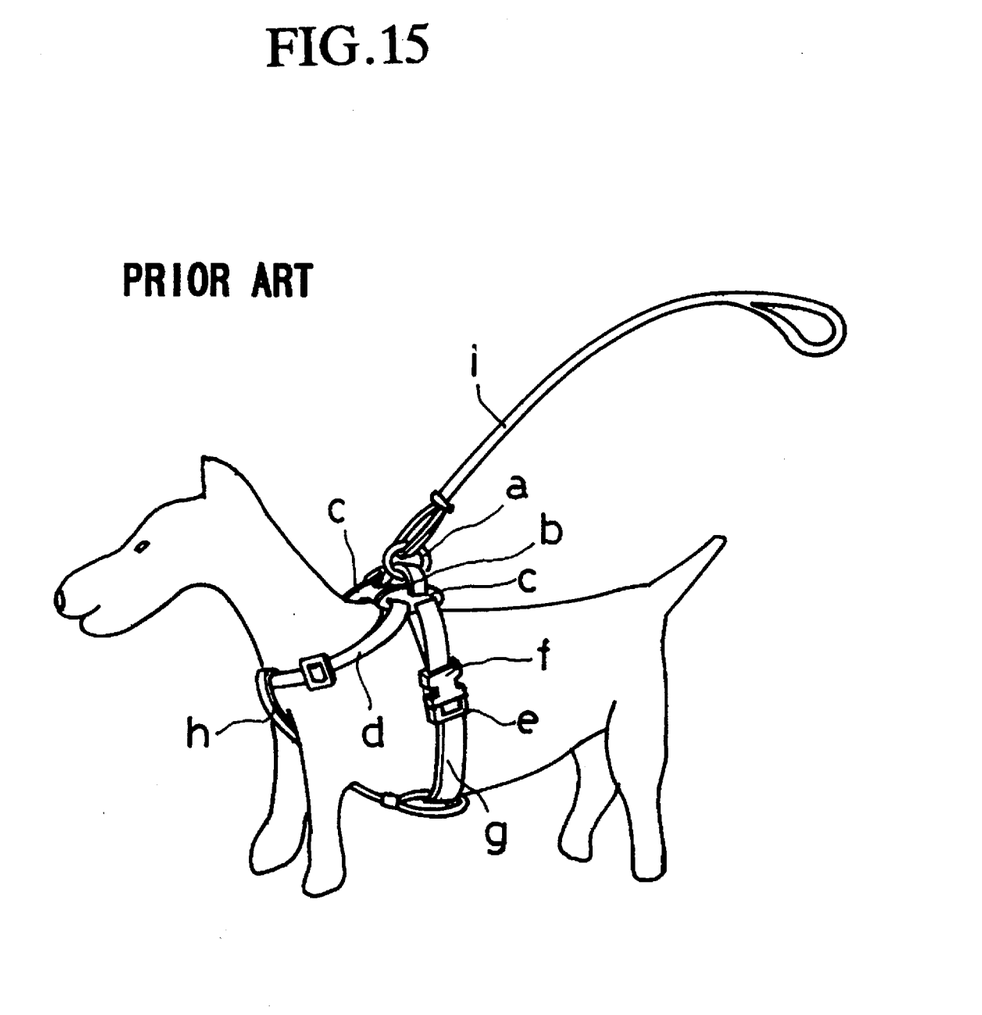
FIG. 15 is a perspective view showing a conventional pet anchor.

As shown in FIG. 15, a conventional body harness for a dog comprises an upper band "b" provided at the center thereof with an engaging fitting "a" to be connected to a distal end of a leash "i"; a front strap "d" both ends of which are connected to connecting members "c" arranged at both ends of said upper band "b"; a body strap "g" provided at a mid-portion thereof with an engaging projection "e" and a receptacle "f" for receiving the projection "e", both ends of the body strap "g" being also connected to the connecting members "c"; and a lower band "h" for connecting mid-portions of the front strap "d" and the body strap "g" (see also Japanese Laid-open Utility Model Publication No. 45445/1994). When travelling with a pet in a vehicle, the proximal end of the leash "i" should be tied to a supporting post of a headrest of a seat of the vehicle.

Using this pet anchor, it requires much labor to tie the proximal end of the leash to the supporting post of the headrest and a foreleg of dog can often be easily freed from the body strap "g" or a knot of the leash "i" can be loosened when the dog moves backward or goes wild. Accordingly, the vehicle driver is often disturbed by the freed dog or the dog may jumped from the vehicle when the door of vehicle is opened.

SUMMARY OF THE INVENTION

It is, therefore, a first object of the present invention to provide a pet anchor which can safely anchor pet or pets such as a dog or a monkey to a seat of a vehicle.

It is a second object of the present invention to provide a pet anchor which permits easy detachment of the looped portion at the proximal end of the leash from the anchor means attached to the seat of the vehicle.

According to the present invention, there is provided a pet anchor comprising an anchor band (or bands) one end of which is adapted to be anchored to a seat of vehicle, and a detachable means connected to the other end of said anchor band (or bands) and adapted to be engaged with a proximal end of a leash for a pet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

A first embodiment of the present invention will be hereinafter described with reference to FIGS. 1 through 8.

Figure 1:
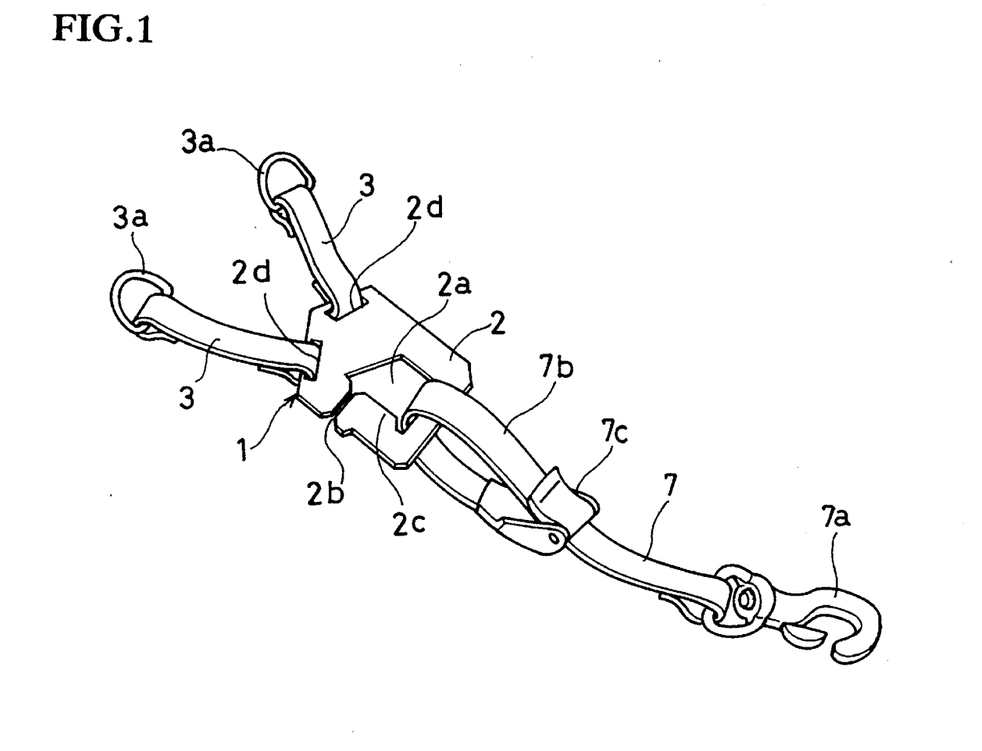
FIG. 1 is a perspective view showing a first embodiment of the present invention.
Figure 2:
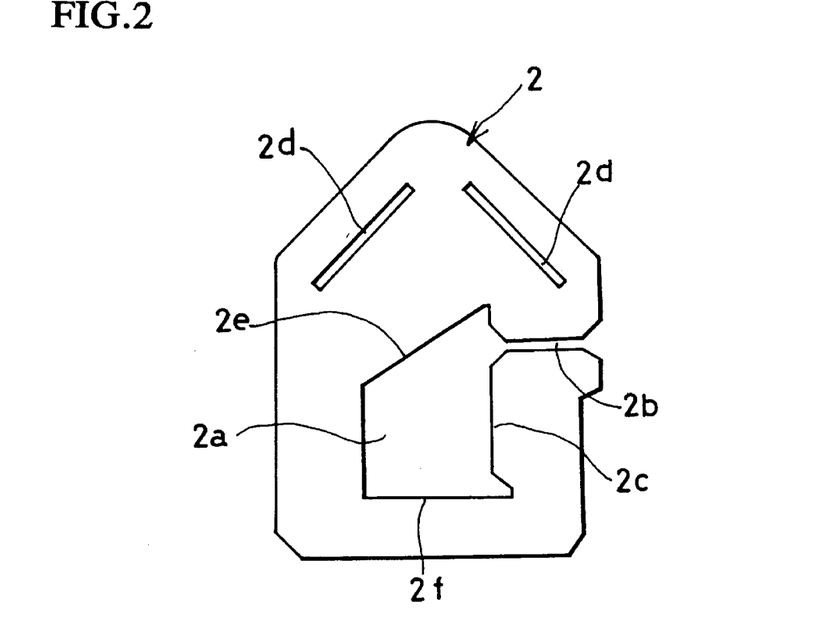
FIG. 2 is a plan view of an anchor plate of the first embodiment of the present invention.

A numeral 1 generally denotes an anchor means comprising an anchor plate 2 and two anchor bands 3 formed of long braids of Nylon or the like. The anchor plate 2 is made of metal or plastic plate and has a substantially "C" shaped configuration having a pair of slots 2d formed in an inverted "V" shaped configuration at a first portion of the anchor plate 2. An engaging recess 2a is formed in a second portion of the anchor plate at the center thereof. A slit 2b is formed in one side of the anchor plate 2 surrounding the engaging recess 2a and an overhang portion 2c projects inwardly within the engaging recess 2a from one lateral side thereof. Each free end (proximal end) of the anchor bands 3 is provided with an anchor ring 3a.

The anchor plate is formed with a slit 2b communicating with the engaging recess 2a and through which a leash may be introduced into said engaging recess. The slit has a width slightly larger than the thickness of the leash. An edge 2f of the engaging recess opposite the first portion has a length slightly longer than the width of the leash, but a width between an inner edge of the overhang portion 2c and an inner edge of an other lateral side opposingly facing the overhang portion 2c is narrower than the leash. The edge 2e of the engaging recess opposite the edge 2f and adjacent the first portion is inclined toward the first portion such that the one lateral side having the overhang portion 2c is longer than said other lateral side.

Figure 3:
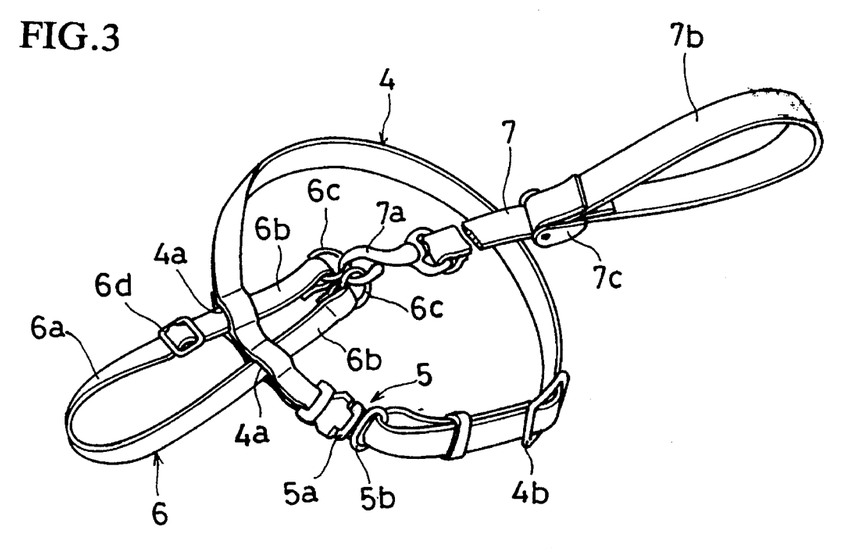
FIG. 3 is a perspective view showing a body harness used in the first embodiment of the present invention.

One example of a body harness suitable for use with the anchor means 1 is shown in FIG. 3.

That is, a numeral 4 denotes a body strap formed of long braids of Nylon or the like and provided with two flat through-holes 4a formed at an upper portion thereof by welding overlapped braids with each other. The body strap 4 is further provided at a side portion thereof with connecting members 5 comprising an engaging projection 5a mounted on one end of the body strap 4 and its receptacle 5b mounted on the other end thereof. The connecting members 5 are connected with each other by spring pieces (not shown) arranged at both sides of the projection 5a expanded within the receptacle 5b by inserting the engaging projection 5a into the receptacle 5b.

A numeral 6 denotes a front strap formed of long braids of Nylon or the like. The front strap 6 is bent in a "U"shaped configuration to form a neck ring portion 6a and a pair of traction portions 6b which pass through said through-holes 4a formed in the body strap 4 and are provided with connecting rings 6c at their proximal ends.

A numeral 7 denotes a leash. The leash 7 is provided with a connector 7a at a distal end thereof and forms a loop shaped portion 7b at a proximal end thereof. An adjuster 7c is mounted on the loop shaped portion 7b for adjusting the length thereof. Similarly, numerals 4b and 6d denote adjusters for adjusting the length of said body strap 4 and front strap 6, respectively.

A method for using the pet anchor of the above mentioned embodiment will be hereinafter described.

Figure 4:
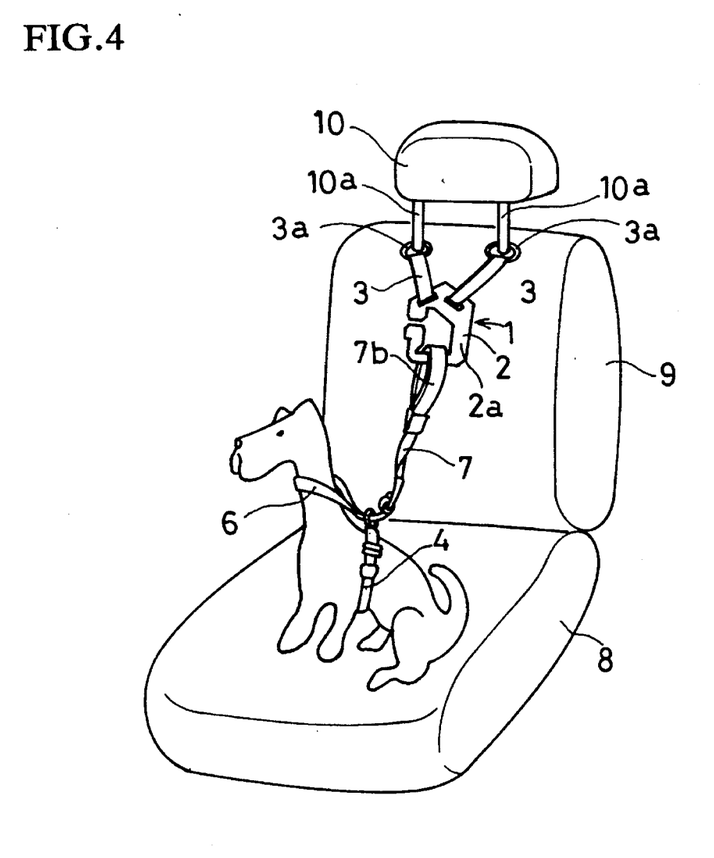
FIG. 4 is a perspective view showing a condition in use of the first embodiment of the present invention.

Firstly, after having pulled out a headrest 10 from its supporting holes formed in a backrest 9 of a seat of vehicle, supporting posts 10a of the headrest 10 are passed through the anchor rings 3a and then are inserted into respective supporting holes in the backrest 9.

On the other hand, after having adjusted the length of the front strap 6 and the body strap 4 so that they fit to a body size of a dog by using their adjusters 6d and 4b, the neck ring portion 6a is put on the neck of dog while the body strap 4 is applied around the body of dog and closed by inserting the engaging projection 5a into the receptacle 5b. Then the connecting rings 6c are hooked by the connector 7a. Finally, the loop shaped portion 7b of the leash 7 is inserted into the engaging recess 2a through the slit 2b of the anchor plate 2.

Figure 5:
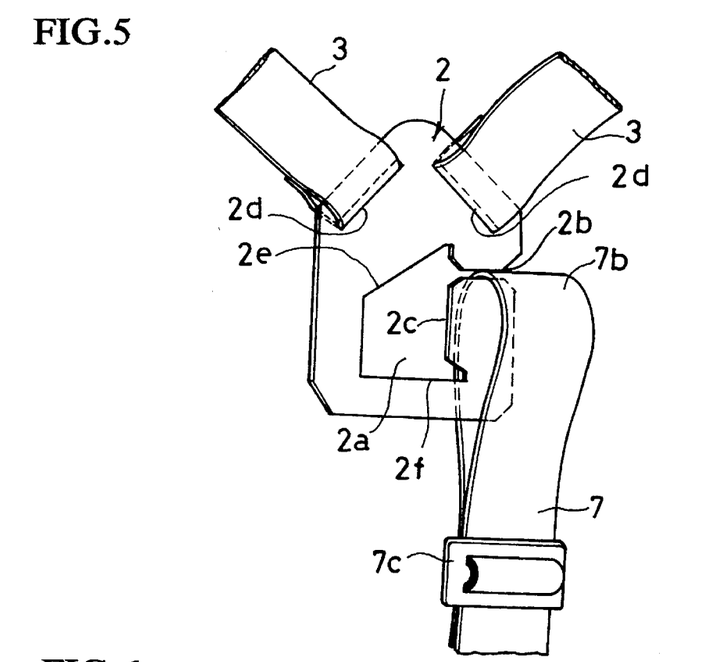
FIG. 5 is an explanatory view showing the way of use of the anchor plate shown in FIG. 2.
Figure 6:
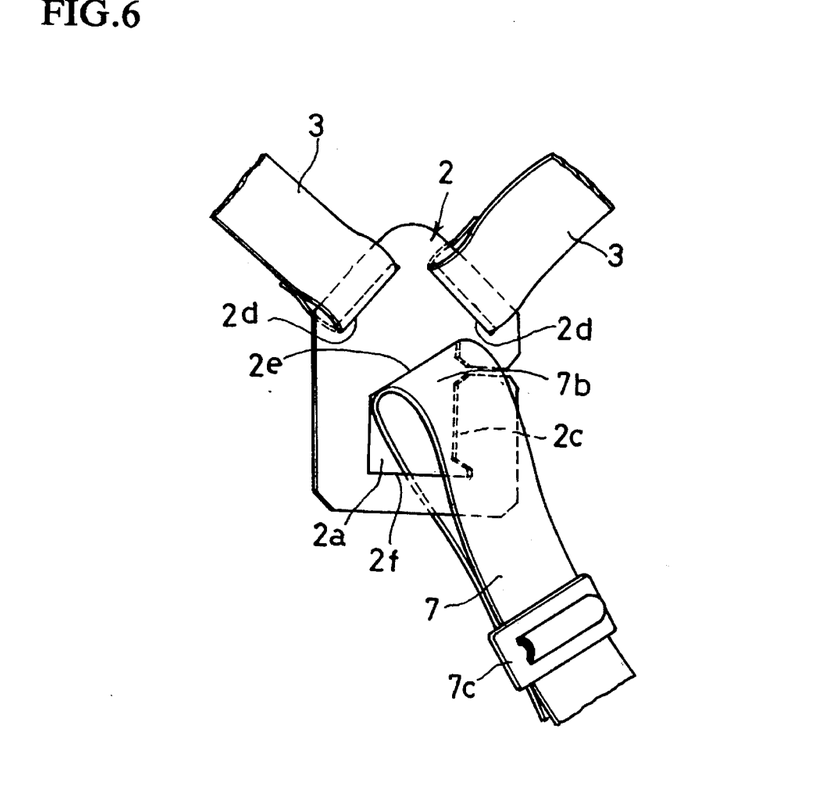
FIG. 6 is an explanatory view showing the way of use of the anchor plate shown in FIG. 2.
Figure 7:
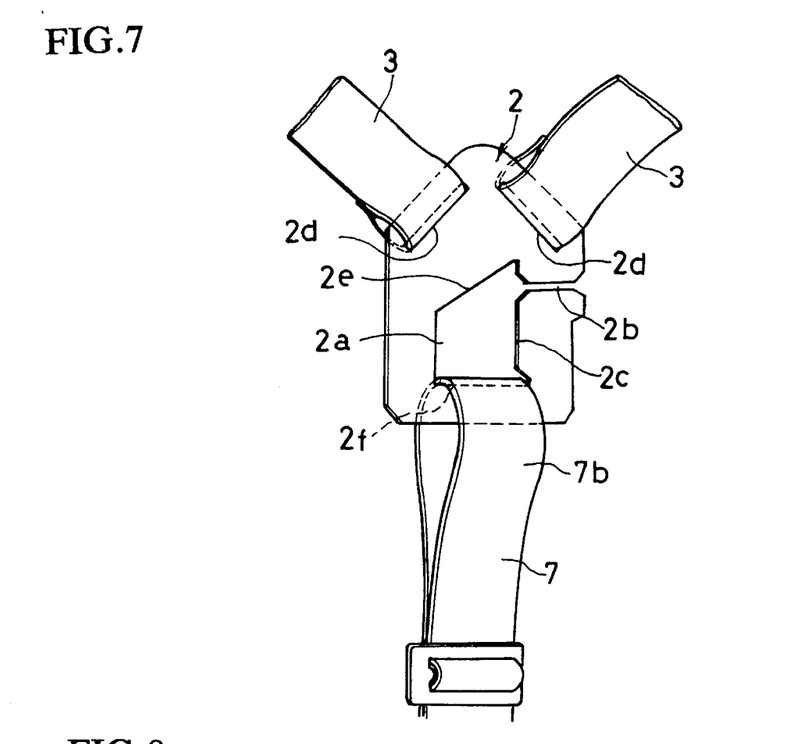
FIG. 7 is an explanatory view showing the way of use of the anchor plate shown in FIG.2.

The manner of inserting the leash 7 into the engaging recess 2a will be described in more detail with reference to FIGS. 5 through 7. The loop shaped portion 7b of the leash 7 is inserted through the slit 2b of the anchor plate 2 (FIG. 5), is then advanced into the engaging recess 2a until the leash 7 abuts against the upper inclined edge 2e (FIG. 6), and is finally pulled down until the leash 7 abuts on the bottom edge 2f (FIG. 7).

The leash 7, once abutted on the bottom edge 2f, cannot disengage therefrom by itself due to the presence of the overhang portion 2c. Even if the leash 7 should clear the overhang portion 2c and disengage from the bottom edge 2f for any reason, coming out through the slit 2b would be very difficult since the leash 7 disengaged from the bottom edge 2f would abut the upper inclined edge 2e.

This makes it possible to keep a dog anchored to the seat of a vehicle since the loop shaped portion 7b is prevented from coming out of the engaging recess 2a by the overhang portion 2c.

Figure 8:
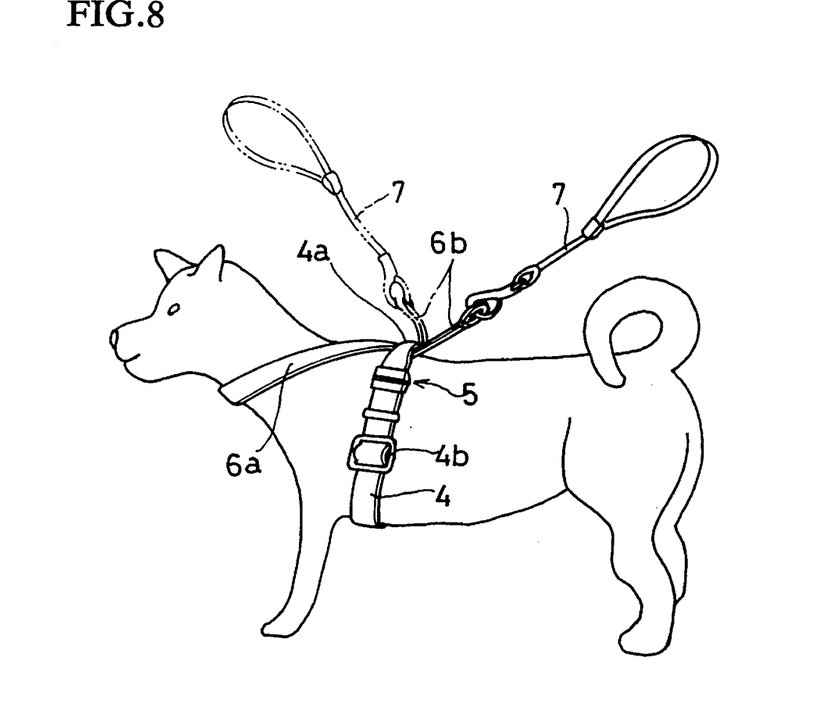
FIG. 8 is a perspective view showing a condition in use of the body band means of FIG. 3.

The dog is held at its neck and chest by the neck ring portion 6a of the front strap 6 and the body strap 4, respectively, as shown in FIG. 8. Thus the neck ring portion 6a can be pulled backward, as shown in FIG. 8, by the leash 7 via the traction portion 6b. Accordingly, the neck of the dog is tightened and simultaneously bent upward toward the supporting points (i.e. through-holes 4a) of the body strap 4 when the dog goes wild or moves backward within the cabin of vehicle. This action of the traction portion 6b suppresses the motion of the dog and thus prevents the vehicle driver from being disturbed or the dog jumping out of the vehicle when the door of the vehicle is opened.

The leash 7 can be detached from the anchor plate 2 by reversing the mounting operation of the leash 7 to the anchor plate 2 described with reference to FIGS. 5 through 7.

Figure 9:
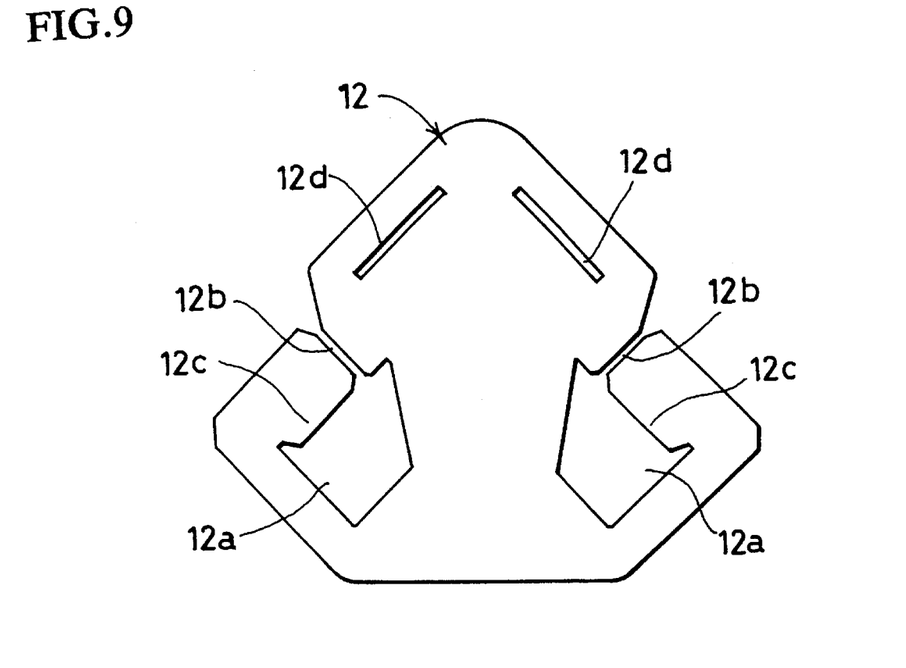
FIG. 9 is a plan view of an anchor plate of a second embodiment of the present invention.

FIG. 9 illustrates a second embodiment of an anchor plate 12 of the present invention. In this embodiment, a pair of slots 12d in an inverted "V" shaped configuration are formed in an anchor plate, as in the embodiment shown in FIG. 2. However, it differs from the embodiment of FIG. 2 in that two engaging recesses 12a are formed in the anchor plate 12 in back to back relation and thus can be used for two dogs simultaneously.

Figure 10:
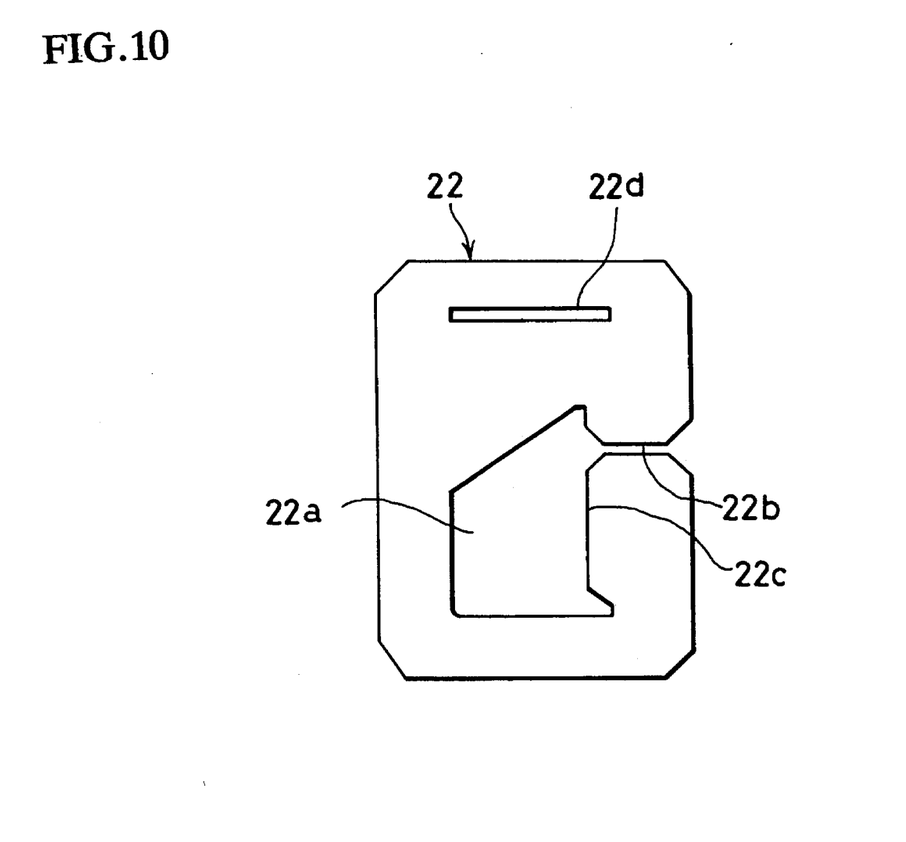
FIG. 10 is a plan view of an anchor plate of a third embodiment of the present invention.

FIG. 10 illustrates a third embodiment of an anchor plate 22 of the present invention. In this embodiment, horizontally formed in the anchor plate 22 is only one slot 22d to which one end of one anchor band 3 is connected. This anchor plate 22 is intended to be anchored to one supporting post 10a of the headrest 10 by inserting the one supporting post 10a into an anchor ring 3a mounted on the other end of the anchor band 3.

Figure 11:
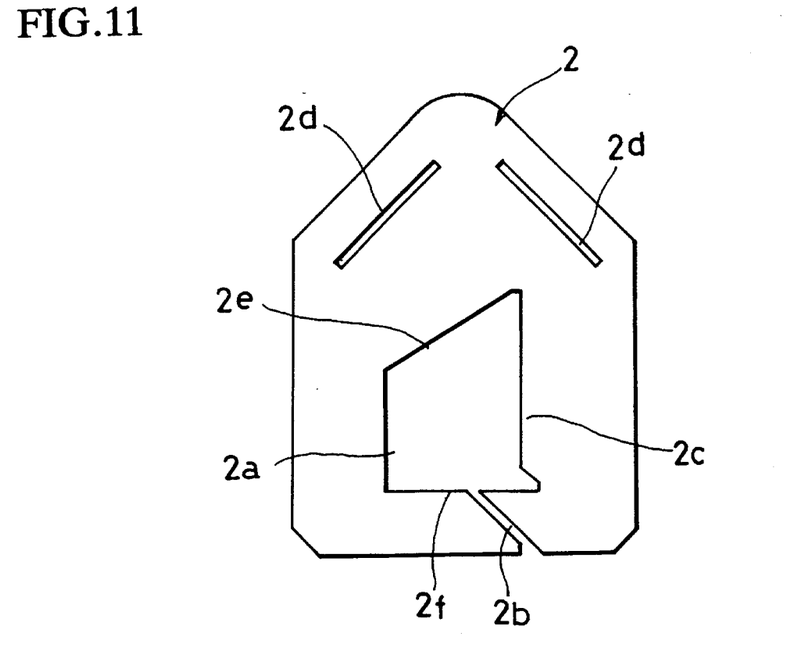
FIG. 11 is a plan view of an anchor plate of a fourth embodiment of the present invention.

FIG. 11 illustrates a fourth embodiment of an anchor plate 2 of the present invention. In this embodiment, the slit 2b is not formed in the lateral side of the anchor plate 2, but is formed in the bottom side. The loop shaped portion 7b of the leash 7 is inserted into the engaging recess 2a through said slit 2b and is engaged with the bottom edge 2f.

The slits 12b and 22b in the anchor plates 12 and 22 shown in FIGS. 9 and 10 may be formed in their bottom side, similarly with the embodiment of FIG. 11.

Figure 12:
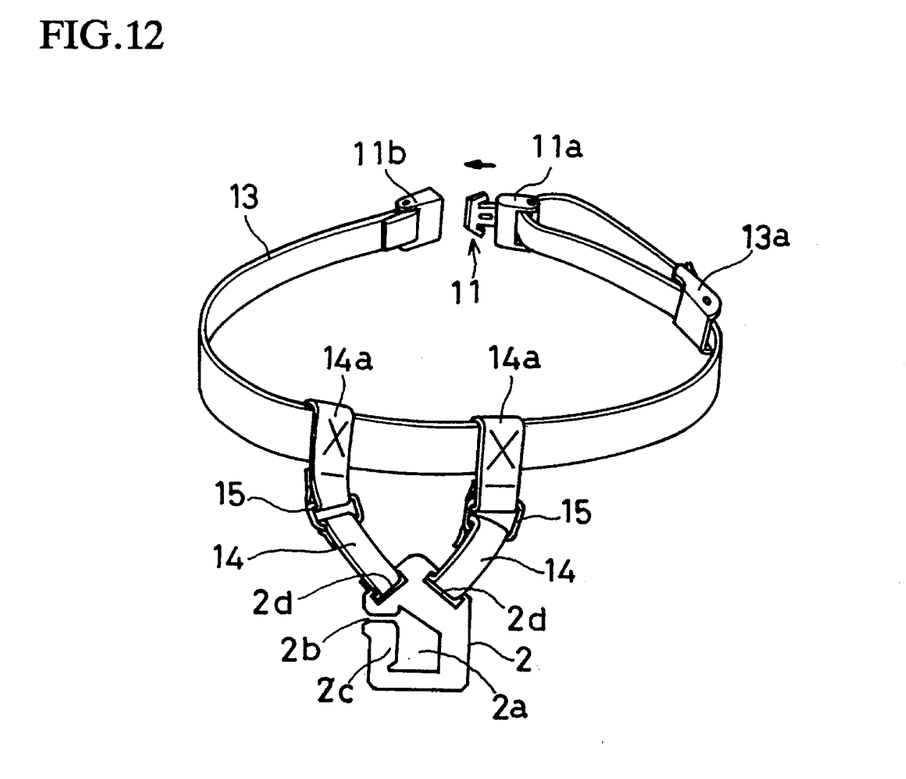
FIG. 12 is a perspective view of a fifth embodiment of the present invention.

FIG. 12 illustrates a fifth embodiment of the present invention. In this embodiment, the anchor means 1 comprises an embracing band 13 formed of braids of Nylon or the like having an engaging projection 11a at one end thereof, a receptacle 11b at the other end thereof, and a length adjuster 13a at a mid-portion thereof; an anchor plate 2; and a pair of anchor bands 14 formed of braids of Nylon or the like, each having one end passed through a slot 2d and connected thereto, and the other end formed as a loop shaped portion 14a through which the embracing band 13 is passed. This anchor means 1 can anchor a dog to the seat 8 by fastening the embracing band 13 around the backrest 9 even though the headrest is formed integrally with the backrest 9.

A numeral 15 denotes connecting rings, each arranged at a mid-portion of each anchor band 14.

Figure 13:
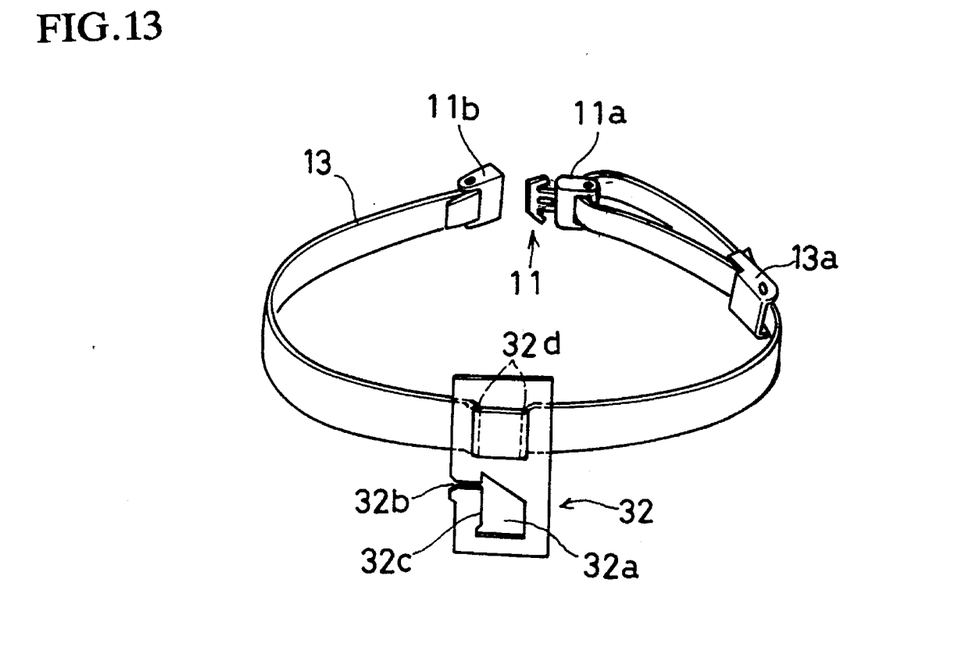
FIG. 13 is a perspective view of a sixth embodiment of the present invention.

FIG. 13 illustrates a sixth embodiment of the present invention which is a simplified version of the fifth embodiment. In this embodiment, an anchor plate 32 is directly mounted on the embracing band 13 by passing the embracing band 13 through slots 32d formed vertically and parallel with each other in the upper portion of the anchor plate 32.

Figure 14:
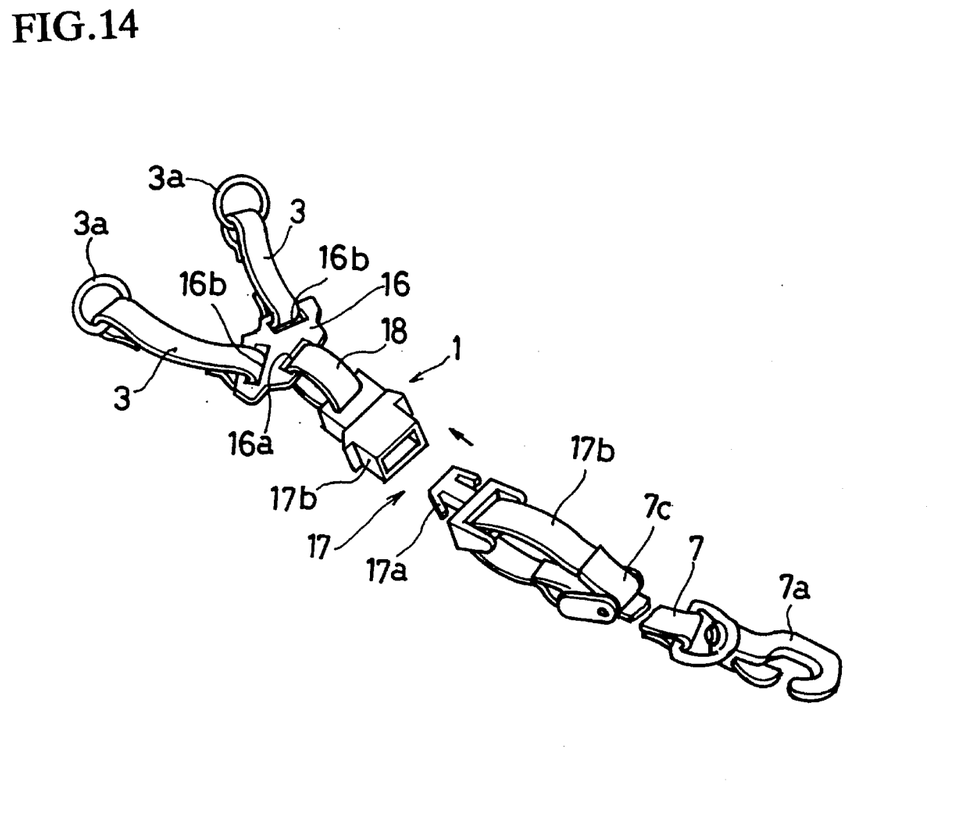
FIG. 14 is a perspective view of a seventh embodiment of the present invention.

FIG. 14 illustrates a seventh embodiment of the present invention. This anchor means 1 comprises a connecting plate 16 of substantially elliptical configuration in which a first slot 16a is formed at a lower center portion thereof and a pair of second slots 16b are formed in an inverted "V" shaped configuration at an upper portion thereof. A connecting band 18 is formed of braids of Nylon or the like, one end of which is passed through the first slot 16a and the other end of which is provided with a receptacle 17b of connecting member 17. A leash 7 has a loop shaped portion 7b to which an engaging projection 17a is connected. Similarly with the first embodiment, the anchor means 1 of this embodiment is anchored to the seat 8 of a vehicle by passing supporting posts 10a of the headrest 10 through the anchor rings 3a mounted on one end of each anchor band 3. The connection of the leash 7 to the anchor means 1 is carried out by inserting the engaging projection 17a into the receptacle 17b.

According to this embodiment, the dog can be easily anchored to the anchor means 1 and detached therefrom by operating the engaging projection 17a and the receptacle 17b of the connecting members 17. Although the engaging projection 17a is mounted on the leash 7 and the receptacle 17b is mounted on the anchor means 1 in the example shown in FIG. 14, the projection 17a and the receptacle 17b may be arranged in a reverse relation.

Obviously, numerous modifications and variations of the present invention are possible in light of the above teachings. It is therefore to be understood that the invention may be practiced otherwise than as specifically described herein.

What is claimed is:

1. A pet anchor comprising:

at least one anchor band, each said anchor band having one end for anchoring the anchor band to a seat of vehicle, and an anchor plate, said anchor plate being formed, at a first portion thereof, with at least one slot, an other end of each said anchor band being securable to said anchor plate at a respective said slot, said anchor plate also being formed, at a second portion thereof, with at least one engaging recess having a substantially "C" shaped configuration and within which a looped end of a leash may be fitted, wherein said anchor plate is formed with a slit communicating with said engaging recess and through which the leash may be introduced into said engaging recess, said slit having a width slightly larger than the thickness of the leash, and wherein an edge of said engaging recess opposite said first portion has a length slightly longer than the width of the leash, further comprising an overhang portion projecting inwardly within said engaging recess and formed in one lateral side in which said slit is formed, such that a width between an inner edge of said overhang portion and an inner edge of an other lateral side opposingly facing said overhang portion is narrower than the leash.

2. A pet anchor according to claim 1 wherein an edge of said engaging recess adjacent said first portion is inclined toward said first portion such that said one lateral side is longer than said other lateral side.

3. A pet anchor according to claim 1 wherein said one end of said anchor band comprises an anchor ring into which a supporting post of a headrest of the seat may be inserted.

4. A pet anchor according to claim 1 wherein said one end of said anchor band comprises a loop shaped embracing band for embracing the seat.

5. A pet anchor according to claim 1 wherein said anchor band comprises a loop shaped embracing band for embracing the seat, and wherein said loop shaped embracing band is passed through said slots of said anchor plate.

6. A pet anchor according to claim 1 wherein said means for detachably engaging comprises connecting members including an engaging projection and a receptacle for detachably receiving said engaging projection, and wherein one of said engaging projection and said receptacle is attached to said other end of said anchor band and the other thereof may be attached to the proximal end of the leash.

7. A pet anchor according to claim 1, further comprising a body harness to which a distal end of the leash may be connected, said body harness including a body strap to be put on a body of dog and a front strap forming a neck ring portion to be put on a neck of dog and having traction portions including proximal ends to which the distal end of the leash may be connected, said traction portions being passed through through-holes formed in an upper portion of the body strap.

8. A pet anchor comprising:

at least one anchor band, each said anchor band having one end for anchoring the anchor band to a seat of vehicle, and an anchor plate, said anchor plate being formed, at a first portion thereof, with at least one slot, an other end of each said anchor band being securable to said anchor plate at a respective said slot, said anchor plate also being formed, at a second portion thereof, with at least one engaging recess having a substantially "C" shaped configuration and within which a looped end of a leash may be fitted, wherein said anchor plate is formed with a slit communicating with said engaging recess and through which the leash may be introduced into said engaging recess, said slit having a width slightly larger than the thickness of the leash, wherein an edge of said engaging recess opposite said first portion has a length slightly longer than the width of the leash, and wherein said slit is formed in a side of said engaging recess having said edge and is inclined relative to a direction perpendicular to said edge.

9. A pet anchor according to claim 8 wherein said one end of said anchor band comprises an anchor ring into which a supporting post of a headrest of the seat may be inserted.

10. A pet anchor according to claim 8 wherein said one end of said anchor band comprises a loop shaped embracing band for embracing the seat.

11. A pet anchor according to claim 8 wherein said anchor band comprises a loop shaped embracing band for embracing the seat, and wherein said loop shaped embracing band is passed through said slots of said anchor plate.

12. A pet anchor according to claim 8 wherein said means for detachably engaging comprises connecting members including an engaging projection and a receptacle for detachably receiving said engaging projection, and wherein one of said engaging projection and said receptacle is attached to said other end of said anchor band and the other thereof may be attached to the proximal end of the leash.

13. A pet anchor according to claim 8, further comprising a body harness to which a distal end of the leash may be connected, said body harness including a body strap to be put on a body of dog and a front strap forming a neck ring portion to be put on a neck of dog and having traction portions including proximal ends to which the distal end of the leash may be connected, said traction portions being passed through through-holes formed in an upper portion of the body strap.

* * * * *